US011167245B2

(12) United States Patent
Miyasaka et al.

(10) Patent No.: US 11,167,245 B2
(45) Date of Patent: Nov. 9, 2021

(54) EXHAUST GAS PURIFYING CATALYST

(71) Applicant: CATALER CORPORATION, Shizuoka (JP)

(72) Inventors: Shu Miyasaka, Shizuoka (JP); Eriko Tanaka, Shizuoka (JP); Norihiko Aono, Shizuoka (JP); Mai Huong Tran, Shizuoka (JP); Keigo Hori, Shizuoka (JP); Daisuke Sugioka, Shizuoka (JP)

(73) Assignee: Cataler Corporation, Kakegawa (JP)

( * ) Notice: Subject to any disclaimer, the term of this patent is extended or adjusted under 35 U.S.C. 154(b) by 0 days.

(21) Appl. No.: 16/485,513

(22) PCT Filed: Feb. 19, 2018

(86) PCT No.: PCT/JP2018/005691
§ 371 (c)(1),
(2) Date: Aug. 13, 2019

(87) PCT Pub. No.: WO2018/151289
PCT Pub. Date: Aug. 23, 2018

(65) Prior Publication Data
US 2020/0047119 A1    Feb. 13, 2020

(30) Foreign Application Priority Data

Feb. 20, 2017 (JP) .............................. JP2017-029297
Nov. 22, 2017 (JP) .............................. JP2017-224344

(51) Int. Cl.
*B01J 29/06* (2006.01)
*B01D 53/86* (2006.01)
(Continued)

(52) U.S. Cl.
CPC .............. *B01D 53/86* (2013.01); *B01D 53/56* (2013.01); *B01D 53/565* (2013.01); *B01D 53/8628* (2013.01); *B01D 53/8631* (2013.01); *B01D 53/92* (2013.01); *B01D 53/945* (2013.01); *B01D 53/9413* (2013.01); *B01D 53/9418* (2013.01); *B01J 23/10* (2013.01); *B01J 23/22* (2013.01); *B01J 23/72* (2013.01); *B01J 23/745* (2013.01); *B01J 23/83* (2013.01); *B01J 23/8472* (2013.01); *B01J 29/061* (2013.01); *B01J 29/072* (2013.01); *B01J 29/076* (2013.01); *B01J 29/7053* (2013.01); *B01J 29/7057* (2013.01); *B01J 29/7065* (2013.01); *B01J 29/76* (2013.01); *B01J 29/763* (2013.01); *B01J 29/7607* (2013.01); *B01J 29/7615* (2013.01); *B01J 29/78* (2013.01); *B01J 29/783* (2013.01); *B01J 29/7807* (2013.01); *B01J 29/7815* (2013.01); *B01J 29/85* (2013.01); *B01J 35/006* (2013.01); *B01J 35/008* (2013.01); *B01J 35/023* (2013.01);
(Continued)

(58) Field of Classification Search
CPC . B01J 29/85; B01J 29/76; B01J 29/076; B01J 29/072; B01J 29/061; B01J 29/7607; B01J 29/7615; B01J 29/763; B01J 29/78; B01J 29/7807; B01J 29/7815; B01J 29/783; B01J 29/7053; B01J 29/7057; B01J 29/7065; B01J 23/72; B01J 23/22; B01J 23/745; B01J 23/10; B01J 23/83; B01J 23/8472; B01J 2229/18; B01J 2229/186; B01J 2229/20; B01J 2229/42; B01J 35/006; B01J 35/008; B01J 35/023; B01J 37/30; B01J 37/0009; B01J 37/0201; B01J 37/0215; B01J 37/0234; B01J 37/0246; B01J 23/63; B01J 37/0244; B01D 53/92; B01D 53/9413; B01D 53/9418; B01D 53/56; B01D 53/565; B01D 53/8628; B01D 53/8631; B01D 2255/50; B01D 2255/502; B01D 2255/206; B01D 2255/2063; B01D 2255/20723; B01D 2255/20761; B01D 2255/20738; B01D 53/945; F01N 3/2803; F01N 3/2066; F01N 2370/04; F01N 2510/063; F01N 2510/0684; Y02T 10/12; Y02A 50/20
USPC ........ 502/4, 60, 63, 64, 65, 66, 69; 422/177, 422/180
See application file for complete search history.

(56) References Cited

U.S. PATENT DOCUMENTS 5,085,840 A    2/1992  Held et al.
6,143,681 A *  11/2000 Sachtler ............. B01D 53/9418
                                                    502/60
(Continued)

FOREIGN PATENT DOCUMENTS

EP    2172268 A1    4/2010
EP    2692437 A1    2/2014
(Continued)

OTHER PUBLICATIONS

Machine translation of JP 2008-212799 A , Sep. 2008.*
(Continued)

*Primary Examiner* — Elizabeth D Wood
(74) *Attorney, Agent, or Firm* — Occhiuti & Rohlicek LLP

(57) ABSTRACT

This exhaust gas purifying catalyst is provided with a substrate 10 and a catalyst layer 20 formed on a surface of the substrate 10. The catalyst layer 20 contains zeolite particles 22 that support a metal, and a rare earth element-containing compound 24 that contains a rare earth element. The rare earth element-containing compound 24 is added in such an amount that the molar ratio of the rare earth element relative to Si contained in the zeolite 22 is 0.001 to 0.014 in terms of oxides.

13 Claims, 6 Drawing Sheets

(51) Int. Cl.

| | |
|---|---|
| B01D 53/94 | (2006.01) |
| B01J 29/072 | (2006.01) |
| B01J 23/83 | (2006.01) |
| B01J 29/78 | (2006.01) |
| B01J 29/76 | (2006.01) |
| B01J 29/076 | (2006.01) |
| B01J 23/10 | (2006.01) |
| B01J 29/70 | (2006.01) |
| B01J 23/847 | (2006.01) |
| B01J 23/72 | (2006.01) |
| B01J 23/22 | (2006.01) |
| B01J 23/745 | (2006.01) |
| B01J 29/85 | (2006.01) |
| B01J 35/02 | (2006.01) |
| B01J 37/02 | (2006.01) |
| B01J 35/00 | (2006.01) |
| B01J 37/30 | (2006.01) |
| B01J 37/00 | (2006.01) |
| B01D 53/56 | (2006.01) |
| B01D 53/92 | (2006.01) |
| B01J 23/63 | (2006.01) |
| F01N 3/28 | (2006.01) |
| F01N 3/20 | (2006.01) |

(52) U.S. Cl.
CPC ....... *B01J 37/0009* (2013.01); *B01J 37/0201* (2013.01); *B01J 37/0215* (2013.01); *B01J 37/0234* (2013.01); *B01J 37/0246* (2013.01); *B01J 37/30* (2013.01); *B01D 2255/206* (2013.01); *B01D 2255/2063* (2013.01); *B01D 2255/20723* (2013.01); *B01D 2255/20738* (2013.01); *B01D 2255/20761* (2013.01); *B01D 2255/50* (2013.01); *B01D 2255/502* (2013.01); *B01J 23/63* (2013.01); *B01J 37/0244* (2013.01); *B01J 2229/18* (2013.01); *B01J 2229/186* (2013.01); *B01J 2229/20* (2013.01); *B01J 2229/42* (2013.01); *F01N 3/2066* (2013.01); *F01N 3/2803* (2013.01); *F01N 2370/04* (2013.01); *F01N 2510/063* (2013.01); *F01N 2510/0684* (2013.01); *Y02A 50/20* (2018.01); *Y02T 10/12* (2013.01)

(56) References Cited

U.S. PATENT DOCUMENTS

| | | | |
|---|---|---|---|
| 7,704,475 B2* | 4/2010 | Bull | B01J 37/0018 423/239.2 |
| 2003/0050182 A1 | 3/2003 | Tran et al. | |
| 2005/0101473 A1* | 5/2005 | Marshall | B01J 29/061 502/60 |
| 2012/0201731 A1* | 8/2012 | Ballinger | B01J 37/0215 423/213.2 |
| 2013/0156668 A1 | 6/2013 | Spurk et al. | |
| 2014/0328738 A1* | 11/2014 | Chandler | B01J 29/783 423/213.2 |
| 2016/0096169 A1* | 4/2016 | Rivas-Cardona | B01D 53/9418 423/700 |
| 2018/0111115 A1* | 4/2018 | Usui | B01J 29/76 |

FOREIGN PATENT DOCUMENTS

| | | |
|---|---|---|
| JP | 8057324 | 3/1996 |
| JP | 3241053 | 12/2001 |
| JP | 2005-502451 | 1/2005 |
| JP | 2005-177570 | 7/2005 |
| JP | 2007-136329 | 6/2007 |
| JP | 2008-212799 | 9/2008 |
| JP | 2013537846 | 10/2013 |
| JP | 2014-069164 | 4/2014 |
| JP | 2015500138 A | 1/2015 |
| JP | 2016-210664 | 12/2016 |
| WO | 2013079954 A1 | 6/2013 |

OTHER PUBLICATIONS

Machine translation of JP 2016-210664 A, Dec. 2016.*
Machine translation of JP 2005-177570 A, Jul. 2005.*
Machine translation of JP 2007-136329 A, Jun. 2007.*
Japanese Office Action dated Jun. 4, 2020 in JP Application No. 2018-568650.
European Search Report dated Nov. 6, 2019 in EP Application No. 18753932.5.

* cited by examiner

EXHAUST GAS PURIFYING CATALYST

CROSS REFERENCE TO RELATED APPLICATIONS

This application is a National Stage of International Application No. PCT/JP2018/005691 filed on Feb. 19, 2018, which claims priority to Japanese Application No. 2017-029297 filed on Feb. 20, 2017 and Japanese Application No. 2017-224344 filed on Nov. 22, 2017, the contents of which are hereby incorporated by reference in their entirety.

TECHNICAL FIELD

The present invention relates to an exhaust gas purifying catalyst. More specifically, the present invention relates to an exhaust gas purifying catalyst that cleans exhaust gases emitted from an internal combustion engine such as a motor vehicle engine.

Moreover, the present application claims priority on the basis of Japanese Patent Application No. 2017-029297, which was filed on 20 Feb. 2017, and Japanese Patent Application No. 2017-224344, which was filed on 22 Nov. 2017, and the entire contents of those applications are incorporated herein by reference.

BACKGROUND ART

Exhaust gases emitted from internal combustion engines such as motor vehicle engines contain harmful components such as carbon monoxide (CO), hydrocarbons (HC) and nitrogen oxides (NOx). These harmful components are known to be primary causes of atmospheric pollution. Three-way catalysts obtained by supporting noble metals such as platinum, rhodium and palladium on porous carriers are widely used as catalysts for purifying a broad range of harmful components in exhaust gases. Among these harmful components, however, NOx are difficult to clean with three-way catalysts. As a result, SCR catalysts (NOx selective catalytic reduction catalysts) have been developed as useful catalysts able to clean NOx. Patent Literature 1 and 2 are cited as technical documents relating to SCR catalysts.

In a typical configuration of a SCR catalyst, a catalyst layer that contains a SCR catalyst is provided on a surface of a substrate such as a honeycomb or filter substrate. Metal-supporting zeolites such as copper-supporting zeolites and iron-supporting zeolites are known as examples of SCR catalysts. By supplying a reducing agent (for example, urea water) to a filter provided with this type of catalyst layer, the reducing agent is hydrolyzed and generates ammonia. If the ammonia is adsorbed on a SCR catalyst, NOx in exhaust gases are cleaned by the reducing action of the ammonia (for example, $4NH_3+2NO_2+2NO \rightarrow 4N_2+6H_2O$).

CITATION LIST

Patent Literature

Patent Literature 1: Japanese Translation of PCT Application No. 2013-537846

Patent Literature 2: Japanese Patent Application Publication No. H08-57324

SUMMARY OF INVENTION

However, according to findings by the inventors of the present invention, if a SCR catalyst obtained using a metal-supporting zeolite mentioned above is exposed to water vapor in a high temperature environment, degradation of the zeolite occurs. This leads to the problem of catalyst performance (for example, NOx purifying performance) decreasing. Therefore, an exhaust gas purifying catalyst in which catalyst performance is unlikely to decrease even when exposed to water vapor in a high temperature environment, in other words, an exhaust gas purifying catalyst having excellent hydrothermal durability, is required.

With these circumstances in mind, the primary objective of the present invention is to provide an exhaust gas purifying catalyst having excellent hydrothermal durability.

The inventors of the present invention found that by adding a rare earth element-containing compound to a catalyst layer containing a metal-supporting zeolite, hydrothermal durability of an exhaust gas purifying catalyst was improved. In addition, the inventors of the present invention found that by adjusting the molar ratio of a rare earth element component contained in the rare earth element-containing compound and a silicon (Si) component contained in the zeolite to an appropriate molar ratio, it was possible to effectively improve hydrothermal durability without causing a decrease in NOx purifying performance of the catalyst as a whole, and thereby completed the present invention.

The present invention provides an exhaust gas purifying catalyst which is disposed in an exhaust pathway of an internal combustion engine and cleans exhaust gas emitted from the internal combustion engine. This exhaust gas purifying catalyst is provided with a substrate and a catalyst layer formed on a surface of the substrate. The catalyst layer contains zeolite particles that support a metal, and a rare earth element-containing compound that contains a rare earth element. An amount of the rare earth element-containing compound contained is such an amount that a molar ratio of the rare earth element relative to Si contained in the zeolite particles is 0.001 to 0.014 in terms of oxides. By adding the rare earth element-containing compound to the zeolite particles so as to attain a specific molar ratio in this way, it is possible to effectively improve hydrothermal durability without causing a decrease in the NOx purifying performance of the catalyst as a whole. Therefore, it is possible to achieve high NOx purifying performance and advantageously maintain this purifying performance over a long period of time.

In a preferred aspect of the exhaust gas purifying catalyst disclosed here, the rare earth element-containing compound is adsorbed on the surface of the zeolite particles. By disposing the rare earth element-containing compound on the surface of the zeolite particles, the advantageous effect of improving hydrothermal durability can be better exhibited.

In a preferred aspect of the exhaust gas purifying catalyst disclosed here, the relationship between an average particle diameter D1 of the zeolite particles and an average particle diameter D2 of the rare earth element-containing compound satisfies the following formula: $0.005<(D2/D1)<0.5$. If the zeolite particles and the rare earth element-containing compound satisfy a specific average particle diameter ratio, the advantageous effect of improving hydrothermal durability can be better exhibited.

In a preferred aspect of the exhaust gas purifying catalyst disclosed here, the average particle diameter D2 of the rare earth element-containing compound is 100 nm or less. In this way, the hydrophilic properties of the surface of the zeolite particles can be efficiently lowered and higher hydrothermal durability can be exhibited.

In a preferred aspect of the exhaust gas purifying catalyst disclosed here, when an amount of the rare earth element at a cross section of a zeolite particle is measured using an Electron Probe Micro Analyzer (EPMA), the amount of the rare earth element present at the surface of the zeolite particle is greater than the amount of the rare earth element present in the inner part of the zeolite particle. In this way, an exhaust gas purifying catalyst having high hydrothermal durability and excellent catalytic activity can be advantageously realized.

In a preferred aspect of the exhaust gas purifying catalyst disclosed here, the rare earth element-containing compound contains at least one of lanthanum oxide and lanthanum hydroxide. The rare earth element-containing compound can effectively contribute to an improvement in hydrothermal durability.

In a preferred aspect of the exhaust gas purifying catalyst disclosed here, the metal supported on the zeolite particles is Cu or Fe. The metal can effectively contribute to an improvement in catalytic activity.

In a preferred aspect of the exhaust gas purifying catalyst disclosed here, the molar ratio of Si and Al in terms of oxides ($SiO_2/Al_2O_3$) in the zeolite particles is 5 to 20. The zeolite can effectively contribute to an improvement in NOx purifying performance.

In a preferred aspect of the exhaust gas purifying catalyst disclosed here, the zeolite particles contain at least one type of zeolite selected from among those represented by structure codes CHA, AFX, AEI, LTA and BEA defined by the International Zeolite Association (IZA). The zeolite can effectively contribute to an improvement in NOx purifying performance.

In addition, the present invention provides an exhaust gas purifying apparatus provided with the exhaust gas purifying catalyst and a reducing agent supply mechanism which supplies a reducing agent for generation of ammonia to the exhaust gas at a position upstream in the exhaust pathway as compared to a position of the exhaust gas purifying catalyst. An exhaust gas purifying apparatus that exhibits higher hydrothermal durability and better NOx purifying performance than in the past is realized by this configuration.

In addition, the present invention provides a catalyst body used in the exhaust gas purifying catalyst. This catalyst body contains zeolite particles that support a metal, and a rare earth element-containing compound that contains a rare earth element, and an amount of the rare earth element-containing compound contained is such an amount that a molar ratio of the rare earth element relative to Si contained in the zeolite particles is 0.001 to 0.014 in terms of oxides.

DESCRIPTION OF EMBODIMENTS

Based on the drawings, explanations will now be given of preferred embodiments of the present invention. Moreover, matters which are essential for carrying out the invention (for example, ordinary matters such as those relating to the arrangement of the exhaust gas purifying catalyst) and which are matters other than those explicitly mentioned in the present specification (for example, the composition of the catalyst layer, and the like) are matters that a person skilled in the art could understand to be matters of design on the basis of the prior art in this technical field. The present invention can be carried out on the basis of the matters disclosed in the present specification and common general technical knowledge in this technical field. Moreover, cases where numerical ranges in the present specification are written as A to B (here, A and B are arbitrary numbers) mean not less than A and not more than B.

<Exhaust Gas Purifying Catalyst>

The exhaust gas purifying catalyst disclosed here comprises a substrate and a catalyst layer formed on a surface of the substrate.

Figure 1:
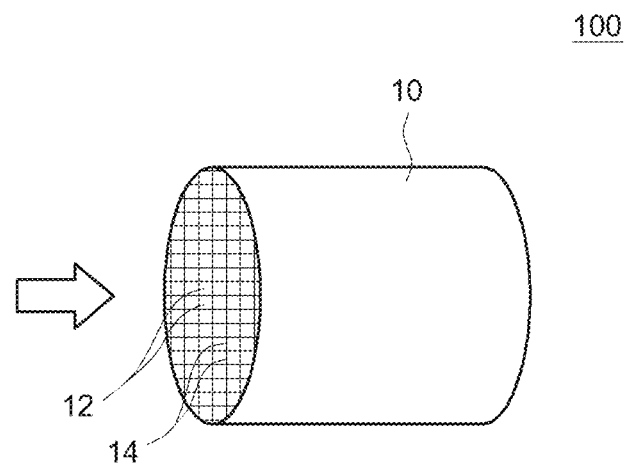
FIG. 1 is a schematic block diagram that illustrates an exhaust gas purifying catalyst according to one embodiment.

FIG. 1 is a schematic diagram of an exhaust gas purifying catalyst 100. The exhaust gas purifying catalyst 100 is disposed in an exhaust pathway of an internal combustion engine. The exhaust gas purifying catalyst 100 has a mechanism that cleans exhaust gases emitted from an internal combustion engine. For example, internal combustion engines comprise mainly gasoline engines and diesel engines. The exhaust gas purifying catalyst 100 is provided with a substrate 10. The substrate 10 has a plurality of regularly arranged cells 12 and rib walls 14 that configure the cells 12.

<Substrate>

For the substrate 10, it is possible to use a variety of conventional materials and forms that were used in the past in such applications. For example, a substrate formed from a ceramic such as cordierite or silicon carbide (SiC) or an alloy such as stainless steel can be advantageously used. In the present embodiment, the substrate 10 is a honeycomb substrate having a honeycomb structure. The substrate 10 is formed into an overall cylindrical shape that extends in the exhaust gas flow direction (shown by the arrows in FIGS. 1 and 2). The substrate 10 is such that the external shape of the substrate as a whole is cylindrical. However, the form of the substrate 10 is not particularly limited, and may be, for example, a foam-like form or pellet-like form in addition to a honeycomb form. In addition, the external shape of the substrate as a whole may be, for example, an elliptic cylinder or a polygonal cylinder instead of a circular cylinder.

A straight flow type substrate, such as a honeycomb substrate, can be given as an example of the substrate 10. A straight flow type substrate is such that the external shape of the substrate as a whole is cylindrical, and a plurality of through holes (cells) are provided as exhaust gas pathways in the cylindrical axis direction of the substrate. In addition, exhaust gases can come into contact with partitions (rib walls) that divide the cells. A wall flow type substrate, such as a filter substrate, can be given as another example of the substrate 10. A wall flow structure substrate typically has inlet-side cells in which only the exhaust gas inlet side end is open, outlet-side cells in which only the exhaust gas outlet side end is open, and porous partitions which divide the inlet-side cells from the outlet-side cells. In such cases, an exhaust gas that flows in from an inlet-side cell passes through a porous cell partition and is discharged to the outside from an outlet-side cell. In addition, while the exhaust gas passes through the porous cell partition, particulate matter is trapped in pores inside the cell partition.

Figure 2:
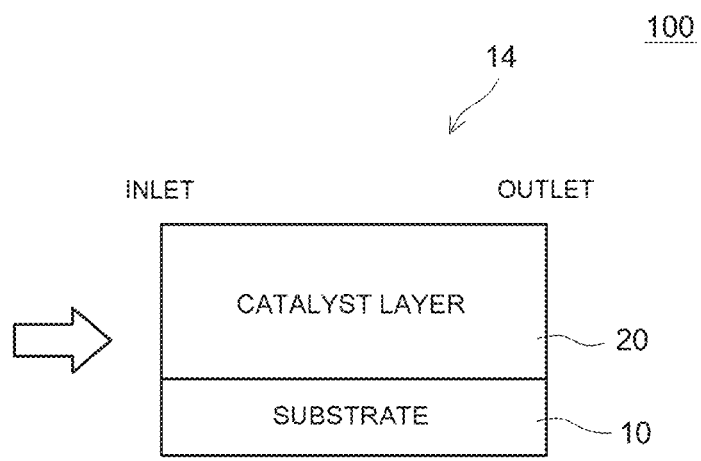
FIG. 2 is a diagram that schematically illustrates a rib wall portion in an exhaust gas purifying catalyst according to one embodiment.
Figure 3:
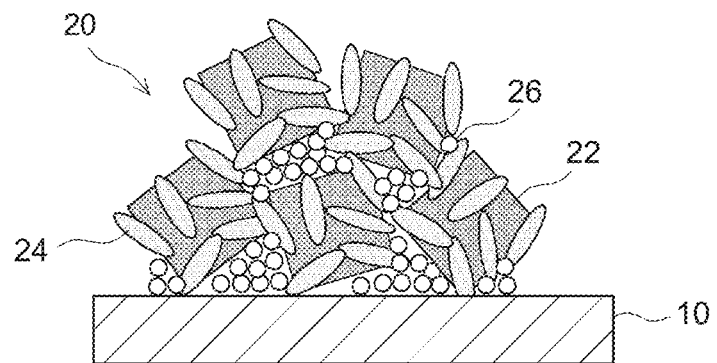
FIG. 3 is a diagram that schematically illustrates a substrate and catalyst layer formed on a surface of the substrate in one embodiment.

FIG. 2 is a diagram that schematically illustrates the configuration of a surface portion of a rib wall 14 in the substrate 10. As shown in FIG. 2, the rib wall 14 is provided with a catalyst layer 20 formed on a surface of the substrate 10. FIG. 3 is a diagram that schematically illustrates the substrate 10 and the catalyst layer 20. As shown in FIG. 3, the catalyst layer 20 contains zeolite particles 22 that support a metal, and a rare earth element-containing compound 24.

<Zeolite>

The zeolite particles 22 contain at least Si as an element that constitutes the basic skeleton. The zeolite particles typically further contain aluminum (Al). The zeolite particles 22 are, for example, a porous crystalline aluminosilicate. The zeolite particles 22 may be, for example, particles in which a cation such as Al or phosphorus (P) is contained within the skeleton of a tetrahedral $SiO_4$ structure in the zeolite. In addition, the zeolite particles 22 may be, for example, particles having a bonded element portion such as Si—O—Al or P—O—Al in the basic skeleton. β zeolites and silico-alumino-phosphate (SAPO) zeolites can be given as specific examples of the zeolite particles 22.

Skeletal structures of zeolites have been listed in a database by the International Zeolite Association (IZA), and skeletal structures have been given structure codes comprising three uppercase letters. A structure code shows the geometric structure of a skeleton. Zeolites represented by the structure codes AEI, AFX, AFT, ATT, BEA, CHA, DDR, ERI, IFY, JST, KFI, LEV, LOV, LTA, OWE, PAU, RHO, RSN, SAV, SFW, TSC, UEI, UFI and VSV can be given as preferred examples of the zeolite particles 22. One or two or more of these can be advantageously used. Of these, CHA, AFX, AEI, LTA and BEA are preferred, and chabazite (CHA) type zeolites in which the average pore diameter is approximately the same as the size of a molecule of NO or $NO_2$ (approximately 0.38 nm) are particularly preferred.

The compositional ratio of a Si component and an Al component in the zeolite particles 22 is not particularly limited, but should generally be such that the $SiO_2/Al_2O_3$ molar ratio in terms of oxides is 1 to 400, preferably 2 to 200, more preferably 3 to 100, further preferably 5 to 50, and particularly preferably 5 to 20, and is 7 to 10 in one example, for example less than 10. In this way, the hydrothermal durability of the exhaust gas purifying catalyst 100 can be more effectively improved and significantly higher NOx purifying performance can be achieved.

The metal is supported on the zeolite particles 22. In this way, NOx in exhaust gases can be efficiently cleaned. If $Al^{3+}$ is introduced at a $Si^{4+}$ position in a tetrahedral $SiO_4$ structure in a zeolite particle 22, one ion exchange site is formed. In one example, an arbitrary metal cation can be supported by means of ion exchange in the zeolite particle 22 using this ion exchange site. That is, the zeolite particles 22 may be an ion exchanged zeolite. Examples of metals that are supported by means of ion exchange in the zeolite particles 22 typically include metals other than Al, for example, transition metals such as copper (Cu), iron (Fe) and vanadium (V). The amount of metal supported is not particularly limited, but is generally 0.5 to 10 mass %, and should typically be 1 to 6 mass %, for example 1 to 5 mass %, if the overall mass of metal-supporting zeolite particles 22 is taken to be 100 mass %.

Zeolite particles 22 may contain optional metal components in addition to the Si, Al, P, Cu, Fe and V mentioned above. Examples of such optional metal components include alkali metal elements such as sodium (Na) and potassium (K); alkaline earth metal elements such as magnesium (Mg) and calcium (Ca); cobalt (Co), nickel (Ni), zinc (Zn), silver (Ag), lead (Pb), vanadium (V), chromium (Cr), molybdenum (Mo), yttrium (Y), cerium (Ce), neodymium (Nd), tungsten (W), indium (In), iridium (Ir) and titanium (Ti).

An average particle diameter D1 of the zeolite particles 22 is not particularly limited, but is generally 0.1 μm or more, preferably 0.2 μm or more, more preferably 0.3 μm or more, and further preferably 0.4 μm or more. The upper limit of the average particle diameter D1 is not particularly limited, but should generally be 10 μm or less. From a perspective such as uniformly disposing the rare earth element-containing compound 24 at the surface of the zeolite particles 22, the average particle diameter D1 is preferably 8 μm or less, more preferably 5 μm or less, and further preferably 3 μm or less. Therefore, the average particle diameter D1 of the zeolite particles 22 should be, for example, 0.3 to 3 μm.

Moreover, the average particle diameter D1 of the zeolite particles 22 should be determined by measurements obtained on the basis of a laser scattering method or observations using a scanning electron microscope (SEM). For example, the particles are first imaged at a magnification of 20,000 times using a field emission-scanning electron microscope (FE-SEM), and a secondary electron image is obtained. Next, the obtained secondary electron image is binarized using image processing software (WinROOF (registered trademark)), and particles are detected. Next, the detected particles are subjected to particle size analysis, and the particle diameter is calculated on the assumption that the particles are completely circular. This is then calculated as the particle diameter of the particles. Particle size analysis should be performed on, for example, 20 to 50 zeolite particles. The number-based average particle diameter D1 can be determined by taking the arithmetic mean of these results. This is also the case in the examples given later.

<Rare Earth Element-Containing Compound>

Typically, it is preferable for the rare earth element-containing compound 24 to contain one or two or more elements selected from among lanthanum (La), cerium (Ce), praseodymium (Pr), neodymium (Nd), samarium (Sm), europium (Eu), gadolinium (Gd), terbium (Tb), dysprosium (Dy), holmium (Ho), erbium (Er), thulium (Tm), ytterbium (Yb), lutetium (Lu), yttrium (Y) and scandium (Sc). Of these, any of La, Ce, Pr and Y are preferred, La and Ce are more preferred, and La is particularly preferred.

The type of rare earth element-containing compound is not particularly limited. The rare earth element-containing compound may be, for example, an oxide, a hydroxide, a nitride, a carbide, a boride, a sulfide, a chloride, a fluoride, a carbonate, a bicarbonate, a sulfate, a nitrate or an oxalate. One or two or more of these can be used. Of these, oxides, hydroxides, carbides and borides are preferred, and oxides and hydroxides are particularly preferred. Specific examples of the rare earth element-containing compound include lanthanum oxide ($La_2O_3$), cerium oxide ($CeO_2$), praseodymium oxide ($Pr_6O_{11}$), yttrium oxide ($Y_2O_3$), lanthanum hydroxide ($La(OH)_3$), cerium hydroxide ($Ce(OH)_3$), praseodymium hydroxide and yttrium hydroxide ($Y(OH)_3$).

In the present embodiment, the rare earth element-containing compound 24 is used by being added to the zeolite particles 22. In this way, the hydrothermal durability of the exhaust gas purifying catalyst 100 can be more effectively improved. The reason why such an effect can be achieved cannot be explained particularly definitively, but is thought to be as follows. The zeolite particles 22, which contain Si as an element that constitutes the basic skeleton, include many silanol groups (Si—OH) at terminals of the basic skeleton and at edges of surface defects and the like. Because silanol groups are hydrophilic, moisture is adsorbed at the surface of zeolite particles 22. If zeolite particles 22 having moisture adsorbed on the surface thereof are exposed to high temperatures, the moisture attacks the zeolite skeleton. In addition, bonded element portions such as Si—O—Al that constitute the skeleton of the zeolite particles 22 are decomposed. It is thought that the skeletal structure of the zeolite disintegrates as a result. It is thought that this skeletal structure disintegration is a primary cause of a reduction in catalytic activity.

However, in the exhaust gas purifying catalyst 100, in which the rare earth element-containing compound 24 is added to the zeolite particles 22, a silanol group at the surface of a zeolite particle 22 reacts with the rare earth element-containing compound 24. In this way, the proportion of silanol groups present at the surface of the zeolite particles 22 is lower than in the past. As a result, the hydrophilicity of the surface of the zeolite particles 22 decreases. Therefore, the structure of the zeolite skeleton is unlikely to disintegrate even if exposed to water vapor in a high temperature environment. It is thought that this contributes to an improvement in hydrothermal durability.

In the present embodiment, the content (added quantity) of the rare earth element-containing compound 24 is such an amount that the molar ratio of the rare earth element relative to Si contained in the zeolite particles 22 is 0.001 or more in terms of oxides. That is, an amount such that (rare earth element oxide/$SiO_2$)≥0.001. If this added quantity falls within such a range, the proportion of silanol groups at the surface of the zeolite particles 22 is effectively reduced and the hydrothermal durability of the exhaust gas purifying catalyst 100 is improved. From a perspective such as further improving hydrothermal durability, this molar ratio is preferably 0.0015 or more, more preferably 0.002 or more, further preferably 0.003 or more, and particularly preferably 0.004 or more.

In addition, the added quantity of the rare earth element-containing compound 24 is such an amount that the molar ratio of the rare earth element relative to Si contained in the zeolite particles 22 is 0.014 or less in terms of oxides. That is, an amount such that (rare earth element oxide/$SiO_2$) ≤0.014. If the added quantity falls within such a range, the surface of the zeolite particles 22 is not excessively covered by the rare earth element-containing compound 24. As a result, it is possible to suppress a reduction in gas permeability and ensure stable contact with exhaust gases. Therefore, high NOx purifying performance can be achieved. From a perspective such as better suppressing a decrease in gas permeability, the molar ratio mentioned above is preferably 0.012 or less, more preferably 0.01 or less, further preferably 0.008 or less, and particularly preferably 0.006 or less.

The feature disclosed here can be advantageously implemented by an embodiment in which the molar ratio of rare earth element relative to Si contained in the zeolite particles 22 is generally 0.003 to 0.01, and especially 0.0035 to 0.009, for example 0.004 to 0.008. Moreover, the rare earth element content can be a value obtained in terms of oxide using $La_2O_3$, $CeO_2$, $Pr_6O_{11}$, $Nd_2O_3$, $Sm_2O_3$, $Eu_2O_3$, $Gd_2O_3$, $Tb_2O_3$, $Dy_2O_3$, $Ho_2O_3$, $Er_2O_3$, $Tm_2O_3$, $Yb_2O_3$, $Lu_2O_3$, $Y_2O_3$ or $Sc_2O_3$.

In a preferred aspect, the rare earth element-containing compound 24 is localized at the surface of the zeolite particles 22. If the rare earth element-containing compound 24 is localized at the surface of the zeolite particles 22, the hydrophilicity of the surface of the zeolite particles 22 is efficiently lowered. In addition, in a preferred aspect, the rare earth element-containing compound 24 adheres to the surface of the zeolite particles 22. In other words, the rare earth element-containing compound 24 is integrated with the zeolite particles 22 by means of physical and/or chemical bonding. In this way, the advantageous effect of improving hydrothermal durability is better exhibited.

The rare earth element-containing compound 24 is typically in the form of particles. An average particle diameter D2 of the rare earth element-containing compound 24 is not particularly limited, but is generally nanometer-sized, and should be, for example, 100 nm or less. In this way, the rare earth element-containing compound 24 can be evenly disposed on the surface of the zeolite particles 22, and the proportion of silanol groups present at the surface of the zeolite particles 22 can be more effectively reduced. From a perspective such as uniformly disposing the rare earth element-containing compound 24 at the surface of the zeolite particles 22, the average particle diameter D2 of the rare earth element-containing compound 24 is preferably 90 nm or less, more preferably 75 nm or less, and further preferably 50 nm or less.

The lower limit of the average particle diameter D2 of the rare earth element-containing compound 24 is not particularly limited, but is generally 1 nm or more, preferably 5 nm or more, more preferably 10 nm or more, and further preferably 20 nm or more. If the average particle diameter D2 is too low, the rare earth element-containing compound 24 may, in some cases, penetrate into the inner part of the zeolite particles 22. If the rare earth element-containing compound 24 penetrates into the inner part of the zeolite particles 22, a metal supported on the zeolite (for example, Cu) may be replaced by the rare earth element, which may lead to loss of a metal that is an active species. As a result, the purifying performance (for example, NOx purifying performance) of the catalyst as a whole may deteriorate. Therefore, the average particle diameter D2 of the rare earth element-containing compound 24 should be, for example, 25 to 100 nm.

Moreover, the average particle diameter D2 of the rare earth element-containing compound should be determined by measurements obtained on the basis of a dynamic light scattering method or observations using a scanning electron microscope (SEM) or transmission electron microscope (TEM). The measurement method to be used depends on the average particle diameter D2.

For example, for particles having an average particle diameter of less than 0.5 μm, the particle diameter should be measured in a state prior to the particulate rare earth element-containing compound 24 being adhered to the surface of the zeolite particles 22. Specifically, a sample is first prepared by diluting a sol, in which the rare earth element-containing compound 24 to be measured is dispersed (at a rare earth element-containing compound concentration of 10% to 20%), as appropriate with water. Next, the sample is irradiated with laser light and the particle diameter is measured by detecting scattered light. In other words, the particle diameter should be measured using a dynamic light scattering method. These measurements can be carried out using, for example, a "Zetasizer (registered trademark) Nano S" available from Malvern Panalytical Ltd.

In addition, for particles having an average particle diameter of 0.5 μm or more, the particle diameter should be measured in a state in which the particulate rare earth element-containing compound is adhered to the surface of the zeolite particles 22. Specifically, the particulate rare earth element-containing compound 24 adhered to the surface of the zeolite particles 22 is first imaged at a magnification of 20,000 times using a field emission-scanning electron microscope (FE-SEM), and a secondary electron image is obtained. Here, whether or not the particles being measured are the rare earth element-containing compound can be determined by energy dispersive X-ray spectroscopy (EDX). In other words, the only particles for which a rare earth element is detected by means of EDX electron analysis are particles of the rare earth element-containing compound. Next, the obtained image is binarized using image analysis software (WinROOF (registered trademark)) so as to detect particles. Next, the detected particles are subjected to particle size analysis, and the particle diameter is calculated on the assumption that the particles are completely circular. This is then calculated as the particle diameter of the particles. Particle size analysis should be performed on, for example, 20 to 50 rare earth element-containing compound particles. The number-based average particle diameter D2 can be determined by taking the arithmetic mean of these results. This is also the case in the examples given later.

From the perspective of exhibiting the advantageous effect of adding the rare earth element-containing compound 24 to the zeolite particles 22 at a higher level, it is preferable for the average particle diameter D1 of the zeolite particles 22 and the average particle diameter D2 of the rare earth element-containing compound 24 to satisfy the following relationship: $0.005<(D2/D1)<0.5$. The feature disclosed here can be advantageously implemented by an embodiment in which, for example, the relationship between the average particle diameter D1 and the average particle diameter D2 is such that $0.008<(D2/D1)<0.4$, more preferably $0.01<(D2/D1)<0.3$, further preferably $0.03<(D2/D1)<0.2$, and particularly preferably $0.05<(D2/D1)<0.15$. In addition, the average particle diameter D1 is preferably at least 100 nm larger, and more preferably at least 200 nm larger, than the average particle diameter D2. In addition, a value obtained by subtracting the average particle diameter D2 from the average particle diameter D1 (D1-D2) is preferably 1000 nm or less, more preferably 800 nm or less, further preferably 600 nm or less, and particularly preferably 500 nm or less.

In a preferred aspect, when an amount of the rare earth element at a cross section of a zeolite particle 22 is measured using an electron probe microanalyzer (EPMA), the amount of the rare earth element present at the surface of the zeolite particle 22 is greater than the amount of the rare earth element present in the inner part of the zeolite particle 22. In other words, if the amount of the rare earth element present at the surface of a zeolite particle 22 is denoted by A and the amount of the rare earth element present in the inner part of the zeolite particle 22 is denoted by B, the relationship A>B should be satisfied.

The amount B of the rare earth element present in the inner part of the zeolite particle 22 should generally be, for example, half or less of the amount A of the rare earth element present at the surface of a zeolite particle 22. That is, A and B above should satisfy the relationship $B/A \leq 0.5$, and are preferably such that $B/A \leq 0.3$, more preferably such that $B/A \leq 0.1$, further preferably such that $B/A \leq 0.05$, and particularly preferably such that $B/A \leq 0.01$. The feature disclosed here can be advantageously implemented by an embodiment in which the amount B of the rare earth element present in the inner part of the zeolite particle 22 is substantially 0 (zero). By constituting in this way, defects are unlikely to occur, such as a metal supported on the zeolite (for example, Cu) being replaced by a rare earth element in the inner part of a zeolite particle 22. As a result, a decrease in purifying performance (for example, NOx purifying performance) of the catalyst as a whole is suppressed and the advantageous effect of improved performance through addition of the rare earth element-containing compound 24 is more advantageously achieved.

A variety of adhesion methods can be used as the method for disposing the rare earth element-containing compound 24 on the surface of the zeolite particles 22. Examples thereof include the following methods: (1) a wet method comprising mixing a rare earth element-containing compound sol, a solvent such as water or an alcohol, and the zeolite particles 22 so as to cause the rare earth element-containing compound 24 to adhere to the surface of the zeolite particles 22; and (2) a dry method comprising mixing a rare earth element-containing compound sol and the zeolite particles 22 in the absence of a solvent so as to cause the rare earth element-containing compound 24 to adhere to the surface of the zeolite particles 22. From a perspective such as evenly disposing the rare earth element-containing compound on the surface of the zeolite particles 22, a dry method is preferred.

In a preferred aspect, the average particle diameter of the rare earth element-containing compound in the rare earth element-containing compound sol that serves as a raw material is generally 1 to 100 nm. If this average particle diameter falls within such a range, it is possible to prevent the rare earth element-containing compound 24 from penetrating into the inner part of the zeolite particles 22. In addition, it is possible to cause the rare earth element-containing compound 24 to adhere to the zeolite particles 22 in a highly dispersed state. As a result, it is possible to uniformly cover the surface of the zeolite particles 22 with the rare earth element-containing compound 24.

The catalyst layer 20 may, if necessary, contain components other than the zeolite particles 22 and the rare earth element-containing compound 24. The catalyst layer 20 includes, for example, a carrier and a noble metal supported on the carrier. The carrier can contain substances used as this type of carrier in the past, such as alumina ($Al_2O_3$), zirconia ($ZrO_2$), and solid solutions and complex oxides thereof. The carrier preferably contains alumina. For example, metal catalysts such as platinum (Pt), palladium (Pd), rhodium (Rh) and silver (Ag) and solid solutions, alloys, and the like, containing these metal catalysts can be advantageously used as the noble metal supported on the carrier. These noble metals preferably have an oxidation catalyst function, that is, a catalyst function capable of removing excess ammonia present in exhaust gases which has not been used for NOx purifying. Pt is an example of a noble metal having an oxidation catalyst function.

<Method for Forming Catalyst Layer>

In order to form of the catalyst layer 20, a slurry containing the zeolite particles 22 to which the rare earth element-containing compound 24 is adhered, an appropriate solvent (for example, water) and other components that constitute catalyst layer should be applied to a surface of the substrate 10. At this point, the slurry may contain a binder 26 from the perspective of increasing adhesion of the slurry to the surface of the substrate 10. It is preferable to use, for example, a silica sol or an alumina sol as the binder. The viscosity of the slurry should be adjusted as appropriate so that the slurry can flow easily into cells 12 of the substrate 10. The slurry applied to the surface of the substrate 10 is dried by heating, and then fired. The solvent is removed in this way. The drying conditions may depend on the form and dimensions of the substrate 10 and carrier, but are generally a temperature of 80° C. to 300° C., for example 100° C. to 250° C. The firing conditions are generally a temperature of 400° C. to 1000° C., for example 500° C. to 700° C.

The coating amount (formed amount) of the catalyst layer 20 is not particularly limited. For example, in cases where a straight flow type substrate (for example, a honeycomb substrate) is used as the substrate, the coating amount per unit volume of catalyst is generally approximately 50 to 300 g/L, and typically 70 to 250 g/L, for example 150 to 220 g/L. In addition, in cases where a wall flow type substrate (for example, a filter substrate) is used as the substrate, the coating amount per unit volume of catalyst is generally approximately 20 to 200 g/L, and typically 50 to 180 g/L, for example 60 to 150 g/L. Moreover, a unit volume (1 L) of catalyst means the bulk volume that includes not only the pure volume of the substrate 10, but also the volume of voids (cells) 12 in the inner part of the catalyst, that is, the catalyst layer 20 formed inside voids (cells) 12.

As mentioned above, the exhaust gas purifying catalyst 100 can effectively improve hydrothermal durability without causing a deterioration in the purifying performance (for example, NOx purifying performance) of the catalyst as a whole. Therefore, the exhaust gas purifying catalyst 100 can be advantageously used as a constituent element of a variety of exhaust gas purifying apparatuses, for example as a SCR catalyst, a three-way catalyst, an NOx storage-reduction (NSR) catalyst or a catalyst obtained by combining these. A specific example thereof is an exhaust gas purifying apparatus provided with the exhaust gas purifying catalyst 100 and a reducing agent supply mechanism which supplies a reducing agent for generation of ammonia at a position upstream in the exhaust pathway as compared to a position of the exhaust gas purifying catalyst 100.

The reducing agent supply mechanism is configured so as to supply a reducing agent to an exhaust gas at a position upstream as compared to a position of the exhaust gas purifying catalyst 100. The reducing agent supply mechanism is a reducing agent solution supply mechanism that is configured so as to supply a reducing agent solution, for example urea water, from a position upstream in the direction of flow of the exhaust gas as compared to a position of the exhaust gas purifying catalyst 100. The reducing agent solution supply mechanism typically comprises a spray nozzle, a pump and a tank. The spray nozzle is connected to the tank by a flow pathway. The pump is disposed in the flow pathway between the spray nozzle and the tank, and supplies the reducing agent solution in the tank to the spray nozzle. The reducing agent solution supplied to the spray tank is sprayed into the exhaust gas in the exhaust pathway, and is transported to the downstream side of the exhaust pathway together with the exhaust gas. The reducing agent solution is hydrolyzed and generates ammonia. The ammonia is adsorbed on the catalyst layer 20 of the exhaust gas purifying catalyst 100. More specifically, the ammonia is adsorbed on the zeolite particles (SCR catalyst) on which the rare earth element-containing compound 24 is adhered. NOx in the exhaust gas are converted into nitrogen and water by the reducing action of the ammonia adsorbed on the catalyst layer 20. In this way, NOx in the exhaust gas are cleaned. According to the features disclosed here, it is possible to realize an exhaust gas purifying apparatus which has higher hydrothermal durability and better purifying performance (for example, NOx purifying performance) than in the past. For example, it is possible to realize an exhaust gas purifying apparatus in which catalyst performance is unlikely to deteriorate even exposed to water vapor in high temperature environments having temperatures of 500° C. or higher, and even 750° C. or higher.

Explanations will now be given of test examples relating to the present invention, but it is not intended that the present invention is limited to these test examples.

Test Example 1

(1) Preparation of Exhaust Gas Purifying Catalyst

Example 1

217 g of a Cu ion exchange zeolite (CHA, $SiO_2/Al_2O_3$ molar ratio=10) was mixed with a solution obtained by mixing 251 g of pure water, 21 g of a $SiO_2$ sol and 31 g of a $La_2O_3$ sol, and stirred for 15 minutes. A slurry of $La_2O_3$-adhered zeolite particles was prepared in this way. The $La_2O_3$ sol was added at a quantity whereby the molar ratio of La contained in the $La_2O_3$ relative to Si contained in the zeolite ($La_2O_3/SiO_2$) was 0.00113 in terms of oxides. In addition, the amount of water in the slurry was adjusted so as to attain a slurry viscosity such that the slurry could be coated on a cordierite honeycomb substrate. The obtained slurry was coated on a cordierite honeycomb substrate at a quantity whereby the coating amount of the Cu ion exchange zeolite (the mass per 1 L of substrate volume) was 180 g/L after firing. Next, excess slurry was removed, and the substrate was then dried at 100° C. and heat treated (fired) for 1 hour at 500° C. A catalyst layer was formed on the surface of the substrate in this way. An exhaust gas purifying catalyst according to the present example was prepared in this way.

Example 2

An exhaust gas purifying catalyst was prepared using the same procedure as that used in Example 1, except that the amount of pure water was changed to 191 g, the amount of the $SiO_2$ sol was changed to 49 g, the amount of the $La_2O_3$ sol was changed to 73 g, and the amount of the Cu ion exchange zeolite (CHA, $SiO_2/Al_2O_3$ molar ratio=10) was changed to 208 g.

Example 3

An exhaust gas purifying catalyst was prepared using the same procedure as that used in Example 1, except that the amount of pure water was changed to 85 g, the amount of the $SiO_2$ sol was changed to 97 g, the amount of the $La_2O_3$ sol was changed to 146 g, and the amount of the Cu ion exchange zeolite (CHA, $SiO_2/Al_2O_3$ molar ratio=10) was changed to 192 g.

Example 4

An exhaust gas purifying catalyst was prepared using the same procedure as that used in Example 1, except that the amount of pure water was changed to 9.4 g, the amount of the $SiO_2$ sol was changed to 146 g, the amount of the $La_2O_3$ sol was changed to 219 g, and the amount of the Cu ion exchange zeolite (CHA, $SiO_2/Al_2O_3$ molar ratio=10) was changed to 149 g.

Example 5

An exhaust gas purifying catalyst was prepared using the same procedure as that used in Example 1, except that the amount of pure water was changed to 20 g, the amount of the $SiO_2$ sol was changed to 154 g, the amount of the $La_2O_3$ sol was changed to 231 g, and the amount of the Cu ion exchange zeolite (CHA, $SiO_2/Al_2O_3$ molar ratio=10) was changed to 115 g.

Example 6

An exhaust gas purifying catalyst was prepared using the same procedure as that used in Example 1, except that the amount of pure water was changed to 242 g, the amount of the $La_2O_3$ sol was changed to 73 g, the amount of the Cu ion exchange zeolite (CHA, $SiO_2/Al_2O_3$ molar ratio=10) was changed to 205 g, and the $SiO_2$ sol was not used.

Example 7

An exhaust gas purifying catalyst was prepared using the same procedure as that used in Example 1, except that the Cu ion exchange zeolite (CHA, $SiO_2/Al_2O_3$ molar ratio=10) was replaced with a Cu ion exchange zeolite (CHA, $SiO_2/Al_2O_3$ molar ratio=15).

Example 8

An exhaust gas purifying catalyst was prepared using the same procedure as that used in Example 2, except that the Cu ion exchange zeolite (CHA, $SiO_2/Al_2O_3$ molar ratio=10) was replaced with a Cu ion exchange zeolite (CHA, $SiO_2/Al_2O_3$ molar ratio=15).

Example 9

An exhaust gas purifying catalyst was prepared using the same procedure as that used in Example 3, except that the Cu ion exchange zeolite (CHA, $SiO_2/Al_2O_3$ molar ratio=10) was replaced with a Cu ion exchange zeolite (CHA, $SiO_2/Al_2O_3$ molar ratio=15).

Example 10

An exhaust gas purifying catalyst was prepared using the same procedure as that used in Example 4, except that the Cu ion exchange zeolite (CHA, $SiO_2/Al_2O_3$ molar ratio=10) was replaced with a Cu ion exchange zeolite (CHA, $SiO_2/Al_2O_3$ molar ratio=15).

Example 11

An exhaust gas purifying catalyst was prepared using the same procedure as that used in Example 5, except that the Cu ion exchange zeolite (CHA, $SiO_2/Al_2O_3$ molar ratio=10) was replaced with a Cu ion exchange zeolite (CHA, $SiO_2/Al_2O_3$ molar ratio=15).

Example 12

An exhaust gas purifying catalyst was prepared using the same procedure as that used in Example 2, except that the Cu ion exchange zeolite (CHA, $SiO_2/Al_2O_3$ molar ratio=10) was replaced with a Cu ion exchange zeolite (AEI, $SiO_2/Al_2O_3$ molar ratio=10).

Example 13

An exhaust gas purifying catalyst was prepared using the same procedure as that used in Example 2, except that the Cu ion exchange zeolite (CHA, $SiO_2/Al_2O_3$ molar ratio=10) was replaced with a Cu ion exchange zeolite (AFX, $SiO_2/Al_2O_3$ molar ratio=10).

Example 14

An exhaust gas purifying catalyst was prepared using the same procedure as that used in Example 1, except that the amount of pure water was changed to 225 g, the amount of the $SiO_2$ sol was changed to 97 g, the amount of the Cu ion exchange zeolite (CHA, $SiO_2/Al_2O_3$ molar ratio=10) was changed to 197 g, and the $La_2O_3$ sol was not used.

Example 15

An exhaust gas purifying catalyst was prepared using the same procedure as that used in Example 1, except that the amount of pure water was changed to 225 g, the amount of the $SiO_2$ sol was changed to 97 g, the Cu ion exchange zeolite (CHA, $SiO_2/Al_2O_3$ molar ratio=10) was replaced with 197 g of a Cu ion exchange zeolite (CHA, $SiO_2/Al_2O_3$ molar ratio=15), and the $La_2O_3$ sol was not used.

Example 16

An exhaust gas purifying catalyst was prepared using the same procedure as that used in Example 14, except that the Cu ion exchange zeolite (CHA, $SiO_2/Al_2O_3$ molar ratio=10) was replaced with 197 g of a Cu ion exchange zeolite (AEI, $SiO_2/Al_2O_3$ molar ratio=10).

Example 17

An exhaust gas purifying catalyst was prepared using the same procedure as that used in Example 14, except that the Cu ion exchange zeolite (CHA, $SiO_2/Al_2O_3$ molar ratio=10) was replaced with 197 g of a Cu ion exchange zeolite (AFX, $SiO_2/Al_2O_3$ molar ratio=10).

The structures of the Cu ion-exchanged zeolites used, the $SiO_2/Al_2O_3$ molar ratios and the molar ratios of $La_2O_3$ relative to $SiO_2$ ($La_2O_3/SiO_2$) contained in the Cu ion-exchanged zeolites for the exhaust gas purifying catalysts of these examples are summarized in Table 1.

(2) Element Mapping

Figure 4:
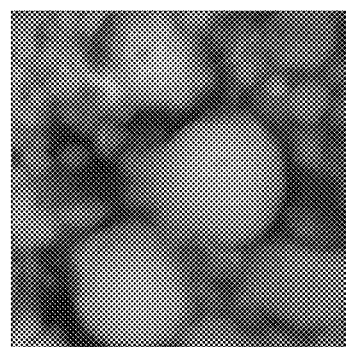
FIG. 4 is a secondary electron image of zeolite particles in Example 2.
Figure 5:
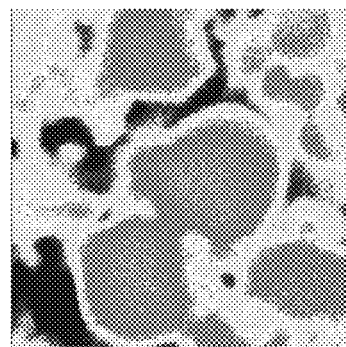
FIG. 5 is a Si element mapping image of zeolite particles in Example 2.
Figure 6:
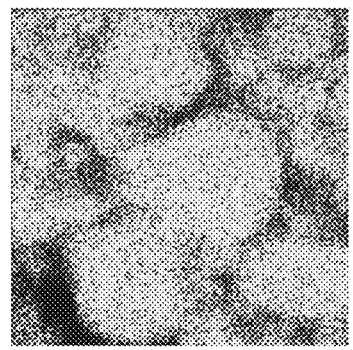
FIG. 6 is an Al element mapping image of zeolite particles in Example 2.
Figure 7:
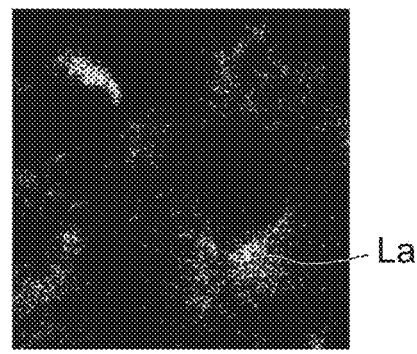
FIG. 7 is a La element mapping image of zeolite particles in Example 2.

A cross section of $La_2O_3$-adhered zeolite particles of Example 2 was measured using a field emission type Electron Probe Micro Analyzer (FE-EPMA), and mapping analysis was carried out for each element. The results are shown in FIGS. 4 to 7. FIG. 4 shows a secondary electron image, FIG. 5 shows a Si element mapping image, FIG. 6 shows an Al element mapping image, and FIG. 7 shows a La element mapping image. As shown in FIG. 5, the detected amount (concentration) of Si element increased towards the inner part of the zeolite particles. In addition, the detected amount (concentration) of Al element was approximately the same at the surface and in the inner part of the zeolite particles, as shown in FIG. 6. As shown in FIG. 7, however, in the $La_2O_3$-adhered zeolite particles of Example 2, the detected amount (concentration) of La element present at the surface of the zeolite particles was higher than the detected amount (concentration) of La element present in the inner part of the zeolite particles. That is, it was confirmed that La element was localized at surface parts of the zeolite particles.

(3) FT-IR Evaluation

Figure 8:
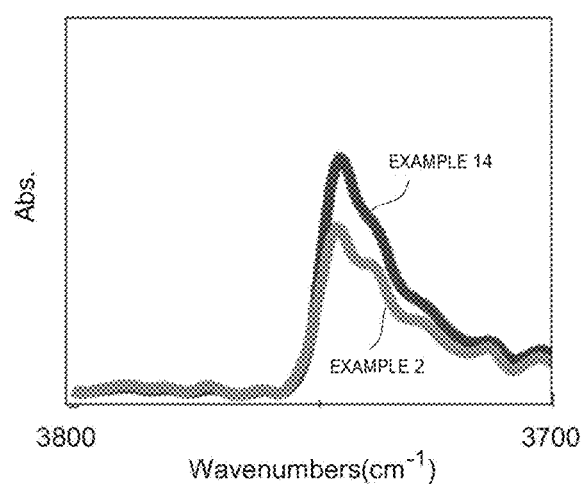
FIG. 8 is a graph that shows FT-IR results for zeolite particles in Example 2 and Example 14.

The $La_2O_3$-adhered zeolite particles of Example 2 and the zeolite particles of Example 14 were measured using a Fourier transform infrared spectrophotometer (FT-IR), and it was confirmed that a silanol group peak was observed at a wavelength close to 3750 cm$^{-1}$. The results are shown in FIG. 8. As shown in FIG. 8, the $La_2O_3$-adhered zeolite particles of Example 2 had a smaller silanol group peak than the zeolite particles of Example 14. From these results, it was confirmed that the amount of silanol groups at the surface of zeolite particles is reduced by addition of $La_2O_3$.

(4) Hydrothermal Durability Test

Figure 9:
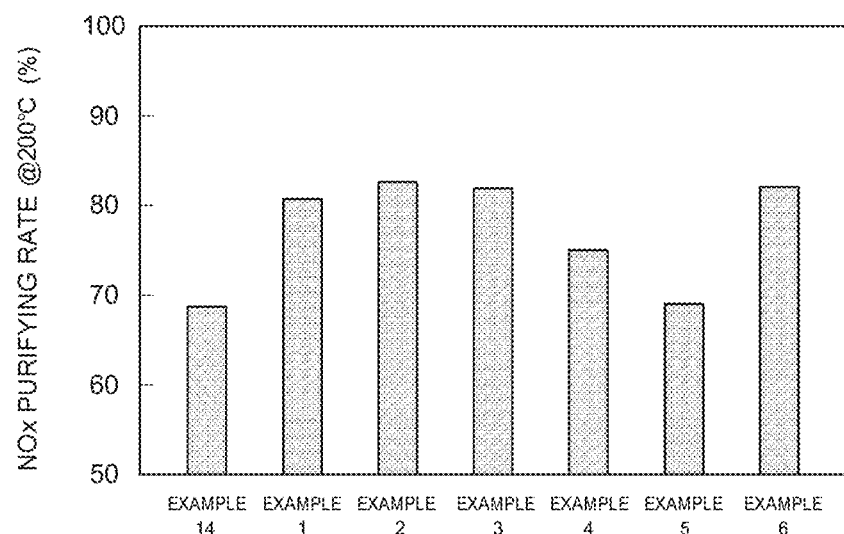
FIG. 9 is a graph in which NOx purifying rates are compared for Examples 1 to 6 and 14.
Figure 10:
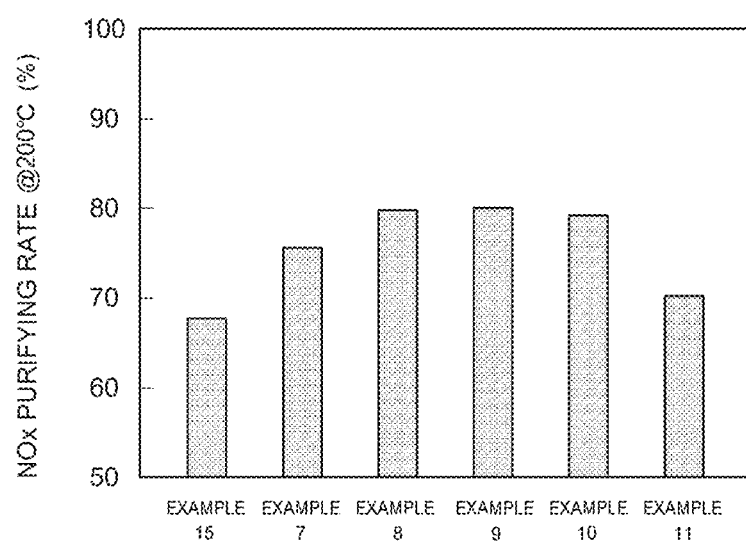
FIG. 10 is a graph in which NOx purifying rates are compared for Examples 7 to 11 and 15.

The hydrothermal durability of the exhaust gas purifying catalysts of the examples was evaluated. A hydrothermal durability test was carried out by holding an exhaust gas purifying catalyst for 30 hours at 750° C. in a gas atmosphere containing 10% of $H_2O$. In addition, following the hydrothermal durability test, a model gas ($NH_3$=500 ppm, NO=500 ppm, $O_2$=10%, $H_2O$=5%, $N_2$=balance) was subjected to NOx purifying by being passed through the exhaust gas purifying catalyst at a temperature of 200° C. The SV (space velocity) was 86,000 h$^{-1}$. In addition the NOx concentration in the gas introduced into the catalyst and the NOx concentration in the gas discharged from the catalyst were measured, and the NOx purifying rate was calculated using the formula below. The results are shown in Table 1, FIGS. 9 and 10. FIG. 9 is a graph in which NOx purifying rates are compared for Examples 1 to 6 and 14. FIG. 10 is a graph in which NOx purifying rates are compared for Examples 7 to 11 and 15.

NOx purifying rate(%)=[(total NOx amount introduced into catalyst)−(total NOx amount discharged from catalyst)]/(total NOx amount introduced into catalyst)

TABLE 1

| | Zeolite | | | NOx |
|---|---|---|---|---|
| | Structure | SiO$_2$/Al$_2$O$_3$ ratio | La$_2$O$_3$/SiO$_2$ molar ratio | purifying rate (%) |
| Example 1 | CHA | 10 | 0.00113 | 80.66 |
| Example 2 | CHA | 10 | 0.00395 | 82.58 |
| Example 3 | CHA | 10 | 0.00789 | 81.88 |
| Example 4 | CHA | 10 | 0.01353 | 75.1 |
| Example 5 | CHA | 10 | 0.01691 | 69.04 |
| Example 6 | CHA | 10 | 0.00395 | 82.1 |
| Example 7 | CHA | 15 | 0.00109 | 75.64 |
| Example 8 | CHA | 15 | 0.00383 | 79.78 |
| Example 9 | CHA | 15 | 0.00765 | 80.01 |
| Example 10 | CHA | 15 | 0.01312 | 79.2 |
| Example 11 | CHA | 15 | 0.0164 | 70.23 |
| Example 12 | AEI | 10 | 0.00395 | 84.5 |
| Example 13 | AFX | 10 | 0.00395 | 83.1 |
| Example 14 | CHA | 10 | 0 | 68.68 |
| Example 15 | CHA | 15 | 0 | 67.72 |

TABLE 1-continued

| | Zeolite | | | NOx |
|---|---|---|---|---|
| | Structure | SiO$_2$/Al$_2$O$_3$ ratio | La$_2$O$_3$/SiO$_2$ molar ratio | purifying rate (%) |
| Example 16 | AEI | 10 | 0 | 75.05 |
| Example 17 | AFX | 10 | 0 | 73.6 |

As shown in Table 1 and FIGS. 9 and 10, the catalysts of Examples 14 and 15, to which $La_2O_3$ was not added, had NOx purifying rates of less than 70% following the hydrothermal durability test and were poor in terms of durability. The reason for this is thought to be that in Examples 14 and 15, the zeolites were readily attacked by water due to the presence of silanol groups. As a result, it is surmised that these zeolites underwent structural breakage and the NOx purifying rate following the hydrothermal durability test decreased. In addition, the samples of Examples 5 and 11, in which the $La_2O_3/SiO_2$ molar ratio was 0.016 or more, had NOx purifying rates of less than 70% following the hydrothermal durability test and were poor in terms of durability. It is surmised that the reason for this is that in Examples 5 and 11, $La_2O_3$ excessively covered the surface of the zeolite particles, meaning that gas permeability decreased and the NOx purifying rate of the catalyst as a whole decreased.

Conversely, the samples of Examples 1 to 4 and 6 to 10, in which the $La_2O_3/SiO_2$ molar ratio was 0.001 to 0.014, had NOx purifying rates of 70% or more following the hydrothermal durability test and maintained a high NOx purifying rate even after the durability test. From these results, it could be confirmed that by adding $La_2O_3$ to a zeolite such that the $La_2O_3/SiO_2$ molar ratio was 0.001 to 0.014, the hydrothermal durability of the catalyst could be effectively improved without causing a decrease in the NOx purifying performance of the catalyst as a whole.

In addition, the samples of Examples 12 and 13, in which the $La_2O_3/SiO_2$ molar ratio was 0.001 to 0.014 and an AEI or AFX zeolite was used, exhibited improved NOx purifying rates following the hydrothermal durability test than Examples 16 and 17, in which $La_2O_3$ was not added and an AEI or AFX zeolite was used. From these results, it could be confirmed that the advantageous effect of the feature disclosed here, that is, the advantageous effect of improving the NOx purifying rate by adding $La_2O_3$ to a zeolite, could be achieved regardless of the type and structure of the zeolite.

Test Example 2

In the present example, the following test was carried out in order to confirm the effect of the average particle diameter D1 of the zeolite particles and the average particle diameter D2 of the rare earth element-containing compound on purifying performance.

Example 18

216 g of pure water, 48 g of a $SiO_2$ sol, 36 g of a $La_2O_3$ sol ($La_2O_3$ content: 20%) and 200 g of a Cu ion exchange zeolite (CHA, $SiO_2/Al_2O_3$ molar ratio=13) were mixed and stirred for 15 minutes. A slurry of $La_2O_3$-adhered zeolite particles was prepared in this way. The $La_2O_3$ sol was added at a quantity whereby the molar ratio of La contained in the $La_2O_3$ relative to Si contained in the zeolite ($La_2O_3/SiO_2$) was 0.00811 in terms of oxides. In addition, the amount of water in the slurry was adjusted so as to attain a slurry viscosity such that the slurry could be coated on a cordierite honeycomb substrate. The obtained slurry was coated on a cordierite honeycomb substrate at a quantity whereby the coating amount of the Cu ion exchange zeolite (the mass per 1 L of substrate volume) was 180 g/L after firing. Next, excess slurry was removed, and the substrate was then dried at 100° C. and heat treated (fired) for 1 hour at 500° C. A catalyst layer was formed on the surface of the substrate in this way. Moreover, the $La_2O_3$ had an average particle diameter D2 of 150 nm, as measured using a dynamic light scattering method, and the zeolite particles had an average particle diameter D1 of 0.4 μm, as measured by means of FE-SEM. An exhaust gas purifying catalyst according to the present example was prepared in this way.

Example 19

180 g of pure water, 48 g of a $SiO_2$ sol, 72 g of a $La_2O_3$ sol ($La_2O_3$ content: 10%) and 200 g of a Cu ion exchange zeolite (CHA, $SiO_2/Al_2O_3$ molar ratio=13) were mixed and stirred for 15 minutes. A slurry of $La_2O_3$-adhered zeolite particles was prepared in this way. Moreover, the $La_2O_3$ had an average particle diameter D2 of 30 nm, as measured using a dynamic light scattering method, and the zeolite particles had an average particle diameter D1 of 0.4 μm, as measured by means of FE-SEM. Other than this, the exhaust gas purifying catalyst was prepared using the same procedure as that used in Example 18.

Example 20

233 g of pure water, 48 g of a $SiO_2$ sol, 3 g of $La(NO_3)_3.6H_2O$ and 200 g of a Cu ion exchange zeolite (CHA, $SiO_2/Al_2O_3$ molar ratio=13) were mixed and stirred for 15 minutes. A slurry of $La(NO_3)_3$-adhered zeolite particles was prepared in this way. On the assumption that the $La(NO_3)_3$ is converted into $La_2O_3$ during firing, the $La(NO_3)_3.6H_2O$ was added at a quantity whereby the molar ratio of La contained in the $La_2O_3$ relative to Si contained in the zeolite ($La_2O_3/SiO_2$) is 0.00116 in terms of oxides. Moreover, the $La(NO_3)_3.6H_2O$ had an average particle diameter D2 of 1.0 nm, as measured using a dynamic light scattering method, and the zeolite particles had an average particle diameter D1 of 0.4 μm, as measured by means of FE-SEM. Other than this, the exhaust gas purifying catalyst was prepared using the same procedure as that used in Example 18.

Example 21

233 g of pure water, 48 g of a $SiO_2$ sol, 10 g of $La(NO_3)_3.6H_2O$ and 200 g of a Cu ion exchange zeolite (CHA, $SiO_2/Al_2O_3$ molar ratio=13) were mixed and stirred for 15 minutes. A slurry of $La(NO_3)_3$-adhered zeolite particles was prepared in this way. On the assumption that the $La(NO_3)_3$ is converted into $La_2O_3$ during firing, the $La(NO_3)_3.6H_2O$ was added at a quantity whereby the molar ratio of La contained in the $La_2O_3$ relative to Si contained in the zeolite ($La_2O_3/SiO_2$) is 0.00406 in terms of oxides. Moreover, the $La(NO_3)_3.6H_2O$ had an average particle diameter D2 of 1.0 nm, as measured using a dynamic light scattering method, and the zeolite particles had an average particle diameter D1 of 0.4 μm, as measured by means of FE-SEM. Other than this, the exhaust gas purifying catalyst was prepared using the same procedure as that used in Example 18.

In the present example, aggregation of La-containing particles occurred during firing because the added quantity of $La(NO_3)_3.6H_2O$ was higher than in Example 22. As a result, the average particle diameter D2, as measured by means of FE-SEM, of the La-containing particles adhered to the zeolite particles was 1.0 μm.

Example 22

An exhaust gas purifying catalyst was prepared using the same procedure as that used in Example 18, except that the $La_2O_3$ sol was not added.

Example 23

An exhaust gas purifying catalyst was prepared using the same procedure as that used in Example 18, except that a Fe ion exchange zeolite (CHA, $SiO_2/Al_2O_3$ molar ratio=13, average particle diameter=0.4 μm) was used instead of a Cu ion exchange zeolite (CHA, $SiO_2/Al_2O_3$ molar ratio=13, average particle diameter=0.4 μm).

Example 24

An exhaust gas purifying catalyst was prepared using the same procedure as that used in Example 19, except that a Fe ion exchange zeolite (CHA, $SiO_2/Al_2O_3$ molar ratio=13, average particle diameter=0.4 μm) was used instead of a Cu ion exchange zeolite (CHA, $SiO_2/Al_2O_3$ molar ratio=13, average particle diameter=0.4 μm).

Example 25

An exhaust gas purifying catalyst was prepared using the same procedure as that used in Example 20, except that a Fe ion exchange zeolite (CHA, $SiO_2/Al_2O_3$ molar ratio=13, average particle diameter=0.4 μm) was used instead of a Cu ion exchange zeolite (CHA, $SiO_2/Al_2O_3$ molar ratio=13, average particle diameter=0.4 μm).

Example 26

An exhaust gas purifying catalyst was prepared using the same procedure as that used in Example 21, except that a Fe ion exchange zeolite (CHA, $SiO_2/Al_2O_3$ molar ratio=13, average particle diameter=0.4 μm) was used instead of a Cu ion exchange zeolite (CHA, $SiO_2/Al_2O_3$ molar ratio=13, average particle diameter=0.4 m).

In the present example, the average particle diameter D2, as measured by means of FE-SEM, of the La-containing particles adhered to the zeolite particles was 1.0 μm because the added quantity of $La(NO_3)_3.6H_2O$ was higher than in Example 25 and aggregation of La-containing particles occurred during firing.

Example 27

An exhaust gas purifying catalyst was prepared using the same procedure as that used in Example 22, except that a Fe ion exchange zeolite (CHA, $SiO_2/Al_2O_3$ molar ratio=13, average particle diameter=0.4 μm) was used instead of a Cu ion exchange zeolite (CHA, $SiO_2/Al_2O_3$ molar ratio=13, average particle diameter=0.4 μm).

The types of rare earth element-containing compounds used, the structures of the ion-exchanged zeolites used, the ion exchange cations, the $SiO_2/Al_2O_3$ molar ratios, the molar ratios of $La_2O_3$ relative to $SiO_2$ ($La_2O_3/SiO_2$) contained in the ion-exchanged zeolites and the ratios (D2/D1) of the average particle diameter D2 of the rare earth element-containing compound relative to the average particle diameter D1 of the zeolite particles for the exhaust gas purifying catalysts of the examples are summarized in Table 2.

Figure 11:
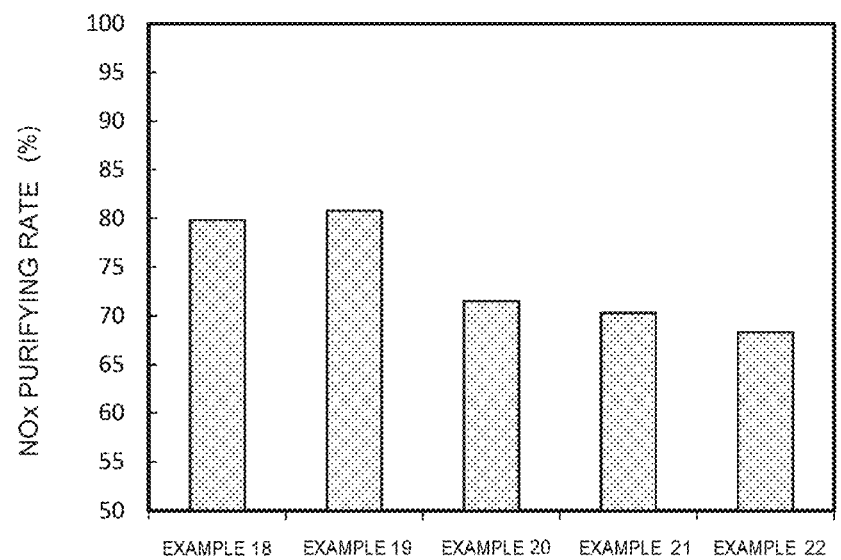
FIG. 11 is a graph in which NOx purifying rates are compared for Examples 18 to 22.
Figure 12:
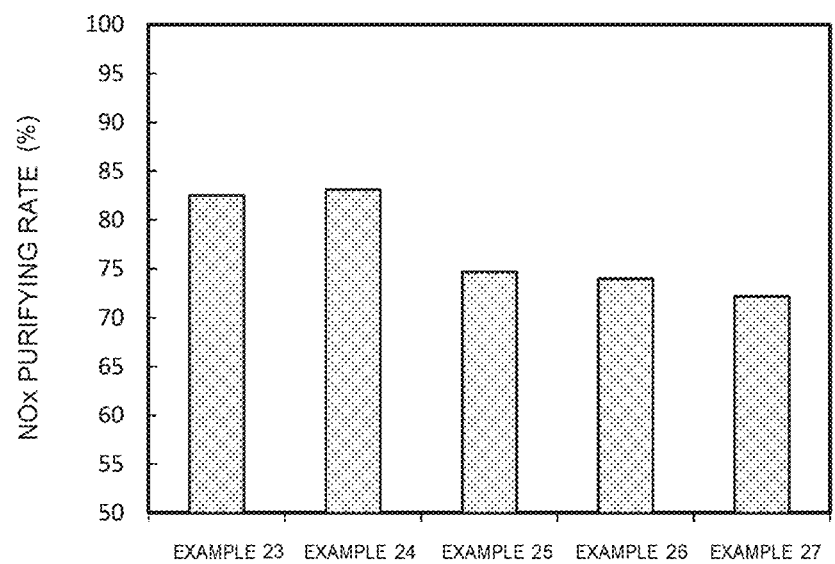
FIG. 12 is a graph in which NOx purifying rates are compared for Examples 23 to 27.

The hydrothermal durability of the exhaust gas purifying catalysts of the examples was evaluated. A hydrothermal durability test was carried out by holding an exhaust gas purifying catalyst for 30 hours at 750° C. in a gas atmosphere containing 10% of $H_2O$. In addition, following the hydrothermal durability test, a model gas ($NH_3$=500 ppm, NO=500 ppm, $O_2$=10%, $H_2O$=5%, $N_2$=balance) was subjected to NOx purifying by being passed through the exhaust gas purifying catalyst at a prescribed temperature (200° C. in Examples 18 to 22, and 400° C. in Examples 23 to 27). The SV (space velocity) was 86,000 $h^{-1}$. In addition the NOx concentration in the gas introduced into the catalyst and the NOx concentration in the gas discharged from the catalyst were measured, and the NOx purifying rate was calculated using the formula below. The results are shown in Table 2, FIGS. 11 and 12. FIG. 11 is a graph in which NOx purifying rates are compared for Examples 18 to 22. FIG. 12 is a graph in which NOx purifying rates are compared for Examples 23 to 27.

NOx purifying rate(%)=[(total NOx amount introduced into catalyst)−(total NOx amount discharged from catalyst)]/(total NOx amount introduced into catalyst)

Test Example 3

In the present example, the following test was carried out in order to confirm the effect of the added quantity of the rare earth element-containing compound on purifying performance in zeolites containing a large quantity of Al($SiO_2/Al_2O_3$=7.5).

Example 28

175 g of pure water, 66 g of a $SiO_2$ sol, 26 g of a $La_2O_3$ sol ($La_2O_3$ content: 10%) and 175 g of a Cu ion exchange zeolite (CHA, $SiO_2/Al_2O_3$ molar ratio=7.5) were mixed and stirred for 15 minutes. A slurry of $La_2O_3$-adhered Cu zeolite particles was prepared in this way. The $La_2O_3$ sol was added at a quantity whereby the molar ratio of La contained in the $La_2O_3$ relative to Si contained in the zeolite ($La_2O_3/SiO_2$) was 0.00368 in terms of oxides. In addition, the amount of water in the slurry was adjusted so as to attain a slurry viscosity such that the slurry could be coated on a cordierite honeycomb substrate. The obtained slurry was coated on a cordierite honeycomb substrate at a quantity whereby the coating amount of the Cu ion exchange zeolite (the mass per 1 L of substrate volume) was 180 g/L after firing. Next,

TABLE 2

| | | Zeolite | | | | |
| | Rare earth element-containing compound | Structure | Ion exchange cation | $SiO_2/Al_2O_3$ molar ratio | $La_2O_3/SiO_2$ molar ratio | D2/D1 | NOx purifying rate (%) |
|---|---|---|---|---|---|---|---|
| Example 18 | $La_2O_3$ | CHA | Cu | 13 | 0.00811 | 0.375 | 79.8 |
| Example 19 | $La_2O_3$ | CHA | Cu | 13 | 0.00811 | 0.075 | 80.8 |
| Example 20 | $La(NO_3)_3 \cdot H_2O$ | CHA | Cu | 13 | 0.00116 | 0.0025 | 71.5 |
| Example 21 | $La(NO_3)_3 \cdot H_2O$ | CHA | Cu | 13 | 0.00406 | 2.5 | 70.3 |
| Example 22 | — | CHA | Cu | 13 | — | — | 68.3 |
| Example 23 | $La_2O_3$ | CHA | Fe | 13 | 0.00811 | 0.375 | 82.5 |
| Example 24 | $La_2O_3$ | CHA | Fe | 13 | 0.00811 | 0.075 | 83.1 |
| Example 25 | $La(NO_3)_3 \cdot H_2O$ | CHA | Fe | 13 | 0.00116 | 0.0025 | 74.7 |
| Example 26 | $La(NO_3)_3 \cdot H_2O$ | CHA | Fe | 13 | 0.00406 | 2.5 | 74.0 |
| Example 27 | — | CHA | Fe | 13 | — | — | 72.2 |

As shown in Table 2 and FIGS. 11 and 12, the catalysts of Examples 18 to 21, in which a La-containing compound was added at a quantity whereby the $La_2O_3/SiO_2$ molar ratio was 0.001 to 0.014, exhibited better NOx purifying rates following the durability test than Example 22. In particular, the catalysts of Examples 18 and 19, in which the ratio (D2/D1) of the average particle diameter D2 of the La-containing compound relative to the average particle diameter D1 of the zeolite particles was such that 0.005<(D2/D1)<0.5, exhibited even better NOx purifying rate results following the durability test than Examples 20 and 21. In addition, the catalysts of Examples 23 to 26, in which a La-containing compound was added at a quantity whereby the $La_2O_3/SiO_2$ molar ratio was 0.001 to 0.014, exhibited a better NOx purifying rate following the durability test than Example 27. In particular, the catalysts of Examples 23 and 24, in which the ratio (D2/D1) of the average particle diameter D2 of the La-containing compound relative to the average particle diameter D1 of the zeolite particles was such that 0.005<(D2/D1)<0.5, exhibited even better NOx purifying rate results following the durability test than Examples 25 and 26.

excess slurry was removed, and the substrate was then dried at 100° C. and heat treated (fired) for 1 hour at 500° C. A catalyst layer was formed on the surface of the substrate in this way. Moreover, the $La_2O_3$ had an average particle diameter D2 of 40 mm, as measured using a dynamic light scattering method, and the zeolite particles had an average particle diameter D1 of 0.37 μm, as measured by means of FE-SEM. An exhaust gas purifying catalyst according to the present example was prepared in this way.

Example 29

222 g of pure water, 42 g of a $SiO_2$ sol, 61 g of a $La_2O_3$ sol ($La_2O_3$ content: 10%) and 175 g of a Cu ion exchange zeolite (CHA, $SiO_2/Al_2O_3$ molar ratio=7.5) were mixed and stirred for 15 minutes. A slurry of $La_2O_3$-adhered Cu zeolite particles was prepared in this way. The $La_2O_3$ sol was added at a quantity whereby the molar ratio of La contained in the $La_2O_3$ relative to Si contained in the zeolite ($La_2O_3/SiO_2$) was 0.00858 in terms of oxides. Other than this, the exhaust gas purifying catalyst was prepared using the same procedure as that used in Example 28.

Example 30

134 g of pure water, 70 g of a $SiO_2$ sol, 102 g of a $La_2O_3$ sol ($La_2O_3$ content: 10%) and 180 g of a Cu ion exchange zeolite (CHA structure, $SiO_2/Al_2O_3$ molar ratio=7.5) were mixed and stirred for 15 minutes. A slurry of $La_2O_3$-adhered Cu zeolite particles was prepared in this way. The $La_2O_3$ sol was added at a quantity whereby the molar ratio of La contained in the $La_2O_3$ relative to Si contained in the zeolite ($La_2O_3/SiO_2$) was 0.01384 in terms of oxides. Other than this, the exhaust gas purifying catalyst was prepared using the same procedure as that used in Example 28.

Example 31

An exhaust gas purifying catalyst was prepared using the same procedure as that used in Example 28, except that the $La_2O_3$ sol was not added.

The types of rare earth element-containing compounds used, the structures of the ion-exchanged zeolites used, the ion exchange cations, the $SiO_2/Al_2O_3$ molar ratios, the molar ratios of $La_2O_3$ relative to $SiO_2$ ($La_2O_3/SiO_2$) contained in the ion-exchanged zeolites and the ratios (D2/D1) of the average particle diameter D2 of the rare earth element-containing compound relative to the average particle diameter D1 of the zeolite particles for the exhaust gas purifying catalysts of the examples are summarized in Table 3.

Figure 13:
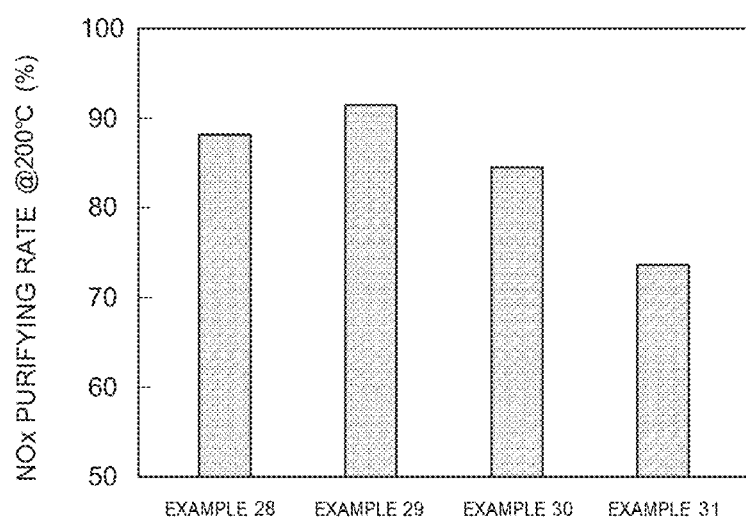
FIG. 13 is a graph in which NOx purifying rates are compared for Examples 28 to 31.

The hydrothermal durability of the exhaust gas purifying catalysts of these examples was evaluated under the same conditions as those used in Test Example 1. In addition the NOx concentration in the gas introduced into the catalyst and the NOx concentration in the gas discharged from the catalyst were measured, and the NOx purifying rate was calculated using the formula below. The results are shown in Table 3 and FIG. 13. FIG. 13 is a graph in which NOx purifying rates are compared for Examples 28 to 31.

NOx purifying rate(%)=[(total NOx amount introduced into catalyst)−(total NOx amount discharged from catalyst)]/(total NOx amount introduced into catalyst)

achieved better results in terms of NOx purifying rate following the durability test. The reason for this is thought to be because the number of active sites in the catalyst increased because the supported amount of Cu was higher and because the adsorbed amount of ammonia was higher.

Specific examples of the present invention have been explained in detail above, but these are merely examples, and do not limit the scope of the invention. The features disclosed in the claims also encompass modes obtained by variously modifying or altering the specific examples shown above.

REFERENCE SIGNS LIST

10 Substrate
20 Catalyst layer
22 Zeolite particle
24 Rare earth element-containing compound
26 Binder
100 Exhaust gas purifying catalyst

The invention claimed is:

1. An exhaust gas purifying catalyst which is disposed in an exhaust pathway of an internal combustion engine and cleans exhaust gas emitted from the internal combustion engine, the exhaust gas purifying catalyst comprising
a substrate and a catalyst layer formed on a surface of the substrate, wherein
the catalyst layer contains zeolite particles that support a metal and that support a rare earth element-containing compound that contains lanthanum (La) as a rare earth element, and
an amount of the rare earth element-containing compound contained is such an amount that a molar ratio of the rare earth element relative to Si contained in the zeolite particles is 0.001 to 0.014 in terms of oxides, wherein

TABLE 3

| | | Zeolite | | | | |
| --- | --- | --- | --- | --- | --- | --- |
| | Rare earth element-containing compound | Structure | Ion exchange cation | $SiO_2/Al_2O_3$ molar ratio | $La_2O_3/SiO_2$ molar ratio | D2/D1 | NOx purifying rate (%) |
| Example 28 | $La_2O_3$ | CHA | Cu | 7.5 | 0.00368 | 0.108 | 88.2 |
| Example 29 | $La_2O_3$ | CHA | Cu | 7.5 | 0.00858 | 0.108 | 91.5 |
| Example 30 | $La_2O_3$ | CHA | Cu | 7.5 | 0.01384 | 0.108 | 84.5 |
| Example 31 | — | CHA | Cu | 7.5 | — | 0.108 | 73.6 |

As shown in Table 3 and FIG. 13, the catalysts of Examples 28 to 30, in which a La-containing compound was added at a quantity whereby the $La_2O_3/SiO_2$ molar ratio was 0.001 to 0.014, exhibited better NOx purifying rates following the durability test than Example 31. Of these, the catalysts of Examples 28 to 29, in which a La-containing compound was added at a quantity whereby the $La_2O_3/SiO_2$ molar ratio was 0.0035 to 0.009, exhibited extremely good NOx purifying rates following the durability test. From these results, it could be confirmed that the advantageous effect of the feature disclosed here, that is, the advantageous effect of improving the NOx purifying rate by adding $La_2O_3$ to a zeolite, could be achieved regardless of the type of the zeolite.

In addition, from a comparison between Examples 1 to 4 and 6 to 10 in Test Example 1 and Examples 28 to 30 in Test Example 3, it can be seen that Examples 28 to 30, in which the $SiO_2/Al_2O_3$ molar ratio in the zeolite was 7 to 10, the rare earth element-containing compound is disposed on a surface of the zeolite particles.

2. The exhaust gas purifying catalyst according to claim 1, wherein a relationship between an average particle diameter D1 of the zeolite particles and an average particle diameter D2 of the rare earth element-containing compound satisfies the following formula: 0.005<(D2/D1)<0.5.

3. The exhaust gas purifying catalyst according to claim 1, wherein an average particle diameter D2 of the rare earth element-containing compound is 100 nm or less.

4. The exhaust gas purifying catalyst according to claim 1, wherein when an amount of the rare earth element at a cross section of a zeolite particle is measured using an Electron Probe Micro Analyzer (EPMA), the amount of the rare earth element present at the surface of the zeolite particle is greater than the amount of the rare earth element present in the inner part of the zeolite particle.

5. The exhaust gas purifying catalyst according to claim 1, wherein the rare earth element-containing compound contains at least one of lanthanum oxide and lanthanum hydroxide.

6. The exhaust gas purifying catalyst according to claim 1, wherein the metal supported on the zeolite particles is Cu or Fe.

7. The exhaust gas purifying catalyst according to claim 1, wherein a molar ratio of Si and Al in terms of oxides ($SiO_2/Al_2O_3$) in the zeolite particles is 5 to 20.

8. The exhaust gas purifying catalyst according to claim 1, wherein the zeolite particles contain at least one type of zeolite selected from among those represented by structure codes CHA, AFX, AEI, LTA and BEA defined by the International Zeolite Association (IZA).

9. The exhaust gas purifying catalyst according to claim 2, wherein the average particle diameter D2 of the rare earth element-containing compound is 100 nm or less.

10. The exhaust gas purifying catalyst according to claim 2, wherein when an amount of the rare earth element at a cross section of a zeolite particle is measured using an Electron Probe Micro Analyzer (EPMA), the amount of the rare earth element present at the surface of the zeolite particle is greater than the amount of the rare earth element present in the inner part of the zeolite particle.

11. The exhaust gas purifying catalyst according to claim 3, wherein when an amount of the rare earth element at a cross section of a zeolite particle is measured using an Electron Probe Micro Analyzer (EPMA), the amount of the rare earth element present at the surface of the zeolite particle is greater than the amount of the rare earth element present in the inner part of the zeolite particle.

12. The exhaust gas purifying catalyst according to claim 2, wherein the rare earth element-containing compound contains at least one of lanthanum oxide and lanthanum hydroxide.

13. The exhaust gas purifying catalyst according to claim 3, wherein the rare earth element-containing compound contains at least one of lanthanum oxide and lanthanum hydroxide.

* * * * *